(12) United States Patent
Moller

(10) Patent No.: US 7,407,587 B1
(45) Date of Patent: Aug. 5, 2008

(54) METHOD AND SORBENT FOR SELECTIVE REMOVAL OF CONTAMINANTS FROM FLUIDS

(75) Inventor: Johanna Teresia Moller, Framingham, MA (US)

(73) Assignee: Layne Christensen Company, Mission Woods, KS (US)

( * ) Notice: Subject to any disclaimer, the term of this patent is extended or adjusted under 35 U.S.C. 154(b) by 151 days.

(21) Appl. No.: 11/277,372

(22) Filed: Mar. 24, 2006

(51) Int. Cl.
*C01B 31/08* (2006.01)
*C02F 1/42* (2006.01)

(52) U.S. Cl. .................. 210/683; 210/688; 502/416

(58) Field of Classification Search ............... 210/683, 210/688; 502/416
See application file for complete search history.

(56) References Cited

U.S. PATENT DOCUMENTS

| | | | |
|---|---|---|---|
| 2,438,230 A | * | 3/1948 | Ryznar .................. 516/93 |
| 5,322,756 A | | 6/1994 | Ziolo |
| 5,358,659 A | | 10/1994 | Ziolo |
| 5,591,346 A | | 1/1997 | Etzel et al. |
| 2005/0038130 A1 | | 2/2005 | Podszun et al. |
| 2005/0150835 A1 | | 7/2005 | Vo |
| 2005/0156136 A1 | | 7/2005 | SenGupta et al. |
| 2006/0037913 A1 | | 2/2006 | Gottlieb et al. |

FOREIGN PATENT DOCUMENTS

GB          788112          12/1957

* cited by examiner

*Primary Examiner*—Chester T. Barry
(74) *Attorney, Agent, or Firm*—Thompson Hine LLP

(57) ABSTRACT

Anion exchange materials loaded with oxygen-containing metal compounds within the exchange matrix as a sorbent, and a method for preparation. The materials remove arsenic and other ligands or contaminants from water and other fluid streams.

19 Claims, 3 Drawing Sheets

METHOD AND SORBENT FOR SELECTIVE REMOVAL OF CONTAMINANTS FROM FLUIDS

FIELD OF THE INVENTION

This invention relates to the method of manufacture and application of a sorbent for the selective removal of contaminants from fluids.

BACKGROUND OF THE INVENTION

Sorption processes to remove contaminants from water are operationally simple, require virtually no start-up time, and are forgiving toward fluctuations in feed compositions. A viable and economically competitive sorbent should exhibit high selectivity toward the target contaminant, should be durable, and should be amenable to efficient regeneration and reuse. Removing the target contaminant should not cause major changes in pH or in the composition of the influent water.

Sorbents that contain at least one oxygen-containing compound of a metal, such as amorphous and crystalline hydrated iron (Fe) oxide compounds (HFO), may have these qualities. Such sorbents show strong sorption affinity toward both arsenic (III) and arsenic (V) species in solution. HFO particles also show strong sorption affinity towards phosphate, natural organic matter (NOM), selenite, molybdate, vanadate, arsenite, arsenate, phosphate, and other ligands. Other competing ions, such as chloride or sulfate, exhibit poor sorption affinity toward HFO particles.

Traditional synthesis processes of HFO produce only very fine (e.g., micron-sized) HFO particles. Such fine HFO particles are unusable in fixed beds, permeable reactive barriers, or any flow through systems because of excessive pressure drops, poor mechanical strength, and unacceptable durability. To overcome the problem of very fine HFO particles, strong-acid cation exchangers have been modified to contain HFO particles. These supported HFO particles are useful for the removal of arsenic and other contaminants.

Iron loaded cation exchange resins, complexing resins, and alginates have also been tried to remove selenium and arsenic oxyanions. Although cation exchanger loaded HFO particles are capable of removing arsenates or phosphates, their removal capacities are reduced because the cation exchange material is negatively charged due to sulfonic acid or other negatively charged functional groups. The HFO particles dispersed in the cation exchange material are not accessible to dissolved anionic ligands for selective sorption. Consequently, arsenates, phosphates and other oxyanions are rejected due to the Donnan co-ion exclusion effect.

Macroporous cation exchange sorbents with dispersed HFO particles provided arsenic sorption capacity of about 750 µg/g sorbent. Gel-type cation exchange sorbents with dispersed HFO particles provided minimal arsenic sorption capacity; a gel-type cation exchange sorbent loaded with eight percent iron resulted in almost immediate arsenic breakthrough. HFO particles encapsulated with cation exchange sites were not accessible to arsenates or other anionic ligands for selective sorption.

Accordingly, there is a need for a more effective medium and method for selective removal of contaminants from fluid streams, and a method for effectively dispersing HFO particles throughout anion exchange materials.

SUMMARY

A method to load an anion exchange material with a metal where an anion exchange material is contacted with a metal salt in an aqueous solvent. In one embodiment, water is the only solvent; that is, the solvent is substantially free of an alcohol or any other solvent. In one embodiment, the solvent is at least 50%$^{v/v}$ water. Contact occurs under conditions to load the anion exchange material with a metal salt. The metal salt loaded anion exchange material is then contacted with a base for a time sufficient to precipitate a hydrous metal oxide, and the metal oxide loaded anion exchange material is washed and neutralized to remove excess base.

These and other embodiments will be further appreciated with reference to the following figures, description, and examples.

DETAILED DESCRIPTION

Figure 1:
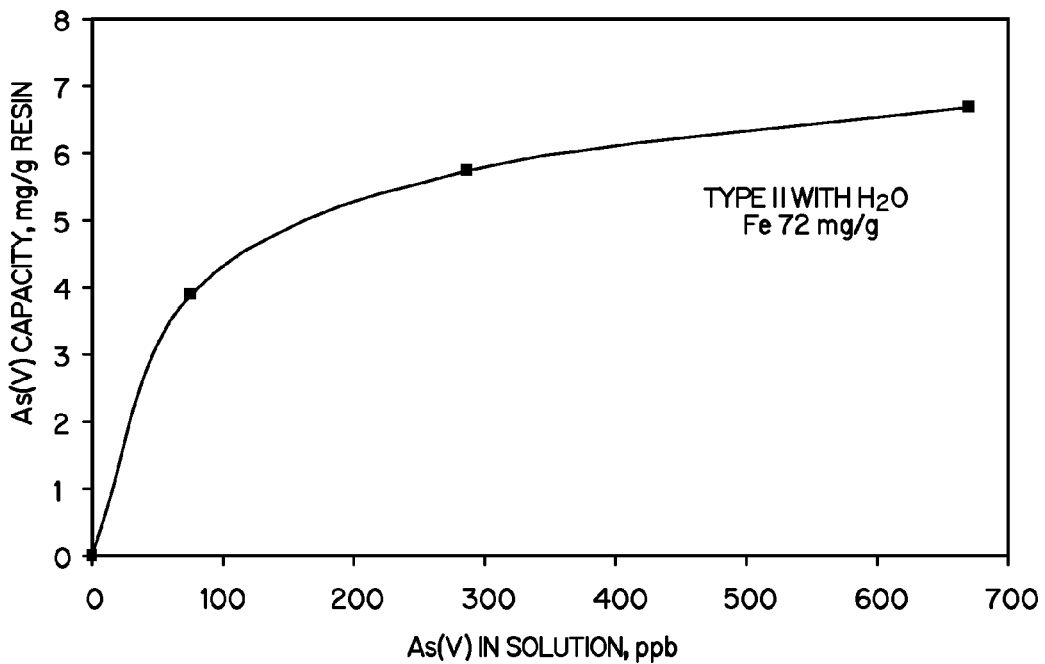
FIG. 1 shows As(V) capacity isotherm for a resin prepared by one embodiment of the method.

Anion exchange materials have positively charged functional groups. Thus, anionic ligands can easily permeate in and out of anion exchange material without encountering the Donnan co-ion exclusion effect. Examples of anionic ligands include, but are not limited to, arsenates, chromates, oxalates, phosphates, and phthalates. Hydrous metal oxide particles, such as hydrous iron oxide (HFO) particles, dispersed or impregnated within an anion exchange material increase anion sorption capacity. Consequently, hydrous metal oxide loaded anion exchange materials exhibit significantly greater capacity for removing arsenates, arsenites, and other arsenic oxyanions, as well as other anionic ligands, in comparison with cation exchange materials. It will be appreciated by one skilled in the art that the terms dispersed, impregnated, or loaded are used synonymously with reference to hydrous metal oxide particles in and/or on the sorbent except as otherwise indicated. It will be appreciated that the terms resin, material, beads, resin beads, are used synonymously with reference to the anion exchange sorbent and include embodiments such as membranes, fibers, and fibrous material except as otherwise indicated.

Dispersing hydrous metal oxide particles such as HFO particles poses a challenge due to the positively charged functional groups of the anion exchange material and heretofore has not been successfully achieved. As cations, $Fe^{+2}$ (Fe(II)) and $Fe^{+3}$ (Fe(III)) are repelled by the positively charged functional groups on anion exchange materials and hence, in most circumstances, cannot be directly loaded. Thus, methods for loading HFO particles within cation exchange materials are not usually applicable when anion exchange materials serve as the sorbent.

An anion exchange material containing loaded metal oxide particles that have been precipitated from a solution into the material, and the method of loading, are disclosed. The metal oxide particles include, but are not limited to, HFO particles.

A fluid containing a ligand, such as an arsenic compound, arsenite, chromate, molybdate, selenite, phosphate, vanadate, or other ligand, is effectively treated using the HFO loaded anion exchange material to reduce or remove the contaminating ligand or compound from the fluid.

The physical properties of the anion exchange material may add structural integrity to materials that are otherwise friable and weak, such as granular ferric oxide (GFO) and granular ferric hydroxide (GFH). Thus, HFO particles dispersed in and/or on anion exchange materials can be synthesized with superior material properties when compared to the granulation or agglomeration of HFO particles. The physical robustness of the HFO loaded resin allows for its use under more demanding conditions (i.e. higher operating pressures, increased flow, etc.). It also permits effective regeneration and reuse of the material, reduces the need for backwashing, and reduces other maintenance problems common in the treatment of streams with hydrous metal oxides that are not supported by substrates. Granular inorganic adsorbents are prone to numerous operational problems due to the low physical strength of the particle aggregates. This leads to a gradual breakdown of the aggregates during routine operations resulting in pressure increases, channeling, and generally poor hydraulic flow through the resin bed.

An anion exchange resin containing hydrous metal oxide particles, such as HFO particles, for selective removal of contaminants or other ligands from fluids is prepared by a sequence of steps. In the inventive method, HFO particles are irreversibly encapsulated within and on the surface of the anion exchange material. However, due to the porous nature of anion exchange resin beads, these HFO particles are still accessible to contaminants (e.g. arsenic) within an aqueous stream contacted with the resin beads. Turbulence and mechanical stirring did not result in any noticeable loss of HFO particles.

The method may be used with both gel-type anion exchange materials (e.g. Purolite A400 (The Purolite Company, Bala Cynwyd Pa.); Tulsion A-23P (Thermax Inc., Novi, Mich.) and macroporous anion exchange materials (e.g. Purolite A503 (The Purolite Co.), Tulsion A-72 MP (Thermax Inc.) and with other positively charged substrates including, but not limited to, membranes, filters, fibers, and other materials that are appropriately functionalized to contain anion exchange sites or groups. The anion exchange material may be of the Type I or Type II strong base organic resin type that contain quaternary groups with a positively charged nitrogen atom (e.g. Purolite A-510 (The Purolite Co.), Amberlite PWA900 (Rohm & Haas Co., Philadelphia Pa.). Alternatively, the anion exchange material may be a weak base organic resin bead containing primary, secondary, and/or tertiary amine groups (e.g. Purolite A100 (The Purolite Co.). If the resin is a bead, the bead may be polystyrene, polystyrene/divinylbenzene, polyacrylic, or other polymeric matrices. The anionic exchange material may also be an inorganic material including, but not limited to, hydrous alumina, hydrous zirconia, hydrous titania, hydrotalcites, and layered double hydroxides (LDH). Various other anionic exchange materials may also be used as known to one skilled in the art. For example, polymeric anion exchange beads exhibit excellent kinetics, hydraulic properties, and durability during fixed bed column runs. In all cases, the dispersed hydrous metal oxide particles in and/or on the beads, fibers, membranes, etc. serve as active sorbents for the contaminants or targeted ligands.

In one embodiment, an anion ion exchange material is contacted for a sufficient time with a metal salt at a concentration from about $7\%^{w/v}$ to about 50% W/v in a solvent that is at least $50\%^{v/v}$ water. In one embodiment, an anion ion exchange material is contacted for a sufficient time with a metal salt at a concentration from about $7\%^{w/v}$ to about $50\%^{w/v}$ in water as the only solvent; that is, in the absence of an alcohol or any other solvent. The contact time may range from about thirty minutes to about eight hours. The resulting metal salt-loaded ion exchange material is separated from the metal salt solution, for example, by filtration. The metal salt-loaded anion exchange material is added to a solution of base at a concentration from about $1\%^{w/v}$ to about $20\%^{w/v}$ and stirred for about fifteen minutes to one hour. The base may be sodium hydroxide, potassium hydroxide, sodium carbonate, sodium bicarbonate, or other alkali. The metal loaded material is filtered, washed, and neutralized to remove any displaced metal hydroxide and residual base, and dried at ambient temperature (e.g., about 19° C. to about 25° C.) or between about 19° C. up to about 150° C. depending upon the chemical and physical characteristics of the anion exchange material. The process may be repeated many times, for example, to further load hydrous metal oxide-loaded anion exchange material.

The metal loaded in and/or on the anion-exchange material is in the form of a hydrous metal oxide or metal hydroxide. The metal may be salts of iron, copper, zinc, nickel, manganese, titanium, zirconium, yttrium, lanthanum (and lanthanides), scandium, yttrium, hafnium, vanadium, niobium, tantalum, chromium, molybdenum, tungsten, manganese, rhenium, ruthenium, osmium, cobalt, rhodium, iridium, palladium, platinum, silver, gold, cadmium, gallium, indium, thallium, germanium, tin, lead, antimony, bismuth, actinium or actinides. In one embodiment, iron salts may be iron (III) sulfate, iron (III) chloride, iron (III) nitrate, iron (III) acetate, and/or other soluble iron (III) salts.

The invention will be further appreciated with respect to the following non-limiting examples.

EXAMPLE 1

A gel-type strong base Type II anion exchange resin (34.5 g (50 mL), Tulsion A-32P, Thermax Inc., Novi Mich.) was contacted with 200 mL of $14\%^{w/v}$ $FeCl_3$ in deionized water for one hour. The golden yellow resin beads were separated from the iron (III) chloride solution by filtration and then contacted with 200 mL of $7.5\%^{w/v}$ NaOH for thirty minutes. Unbound HFO, evidenced as brown iron floc, was decanted and the iron-loaded dark red resin was rinsed with tap water until free of loose iron hydroxide. A fresh 200 mL of $14\%^{w/v}$ $FeCl_3$ in deionized water was then added to the iron-loaded resin beads and stirred for one hour (second iron contact cycle). The resin was again separated by filtration and then contacted with 200 mL $7.5\%^{w/v}$ NaOH to precipitate the HFO particles. The residual iron floc was decanted and the beads were washed with tap water until free of loose iron hydroxide. The iron-loaded dark red resin was washed and neutralized with 5% NaCl that was sparged with $CO_2$ to reduce the pH. The iron content in the resin was 72 mg iron/g of dry material.

Different masses of resin were shaken for about 18 hours with a 1 ppm solution of arsenic(V) in 120 ppm sulfate, 100 ppm bicarbonate, and 33 ppm chloride. The amount of arsenic remaining in solution was then measured and the mg of arsenic adsorbed per gram of resin plotted. The performance of the resin for percent of As(V) uptake is shown in FIG. 1. These data demonstrated that all final products had a significant affinity for As(V) in the presence of much higher concentrations of competing ions such as bicarbonate, sulfate, and chloride. This confirmed the applicability of these Fe loaded materials for treating drinking water and other aqueous media.

EXAMPLE 2

A gel-type strong base Type I anion exchange resin (34.5 g (50 mL) Tulsion A-23P, Thermax Inc., Novi, Mich.) was contacted with 200 mL of $FeCl_3$ in deionized water for one hour. Five different $FeCl_3$ concentrations in water were used: $14\%^{w/v}$, $21\%^{w/v}$, $28.5\%^{w/v}$, $35\%^{w/v}$ and $50\%^{w/v}$.

The number of iron contact cycles for each reaction is given in Table 1, showing synthesis reaction conditions.

TABLE 1

| $FeCl_3$ concentration | Number of cycles | Samples taken at cycle | Final color of beads |
|---|---|---|---|
| $14\%^{w/v}$ | 4 | 3 and 4 | dark red/brown |
| $21\%^{w/v}$ | 2 | 2 | dark red/brown |
| $28.5\%^{w/v}$ | 2 | 1 and 2 | blackish |
| $35\%^{w/v}$ | 2 | 1 and 2 | black |
| $50\%^{w/v}$ | 1 | 1 | orange/red |

After each iron contact cycle, the resin beads were contacted with 200 mL of $7.5\%^{w/v}$ NaOH for thirty minutes, except the resin beads that had been contacted with $50\%^{w/v}$ $FeCl_3$ which were contacted with $10\%^{w/v}$ NaOH for thirty minutes. Each sample was rinsed with tap water before contacting with a fresh iron (III) chloride solution. All samples were neutralized with 5% NaCl that was sparged with $CO_2$.

Additional iron contact cycles permitted additional iron to be loaded onto the resin beads. Table 2 demonstrates the effect of iron concentration and the number of iron contact cycles on loading of iron from water on Type I resin beads.

TABLE 2

| Sample | [Fe] mg/g dry resin beads |
|---|---|
| $14\%^{w/v}$ $FeCl_3$ 3rd iron contact cycle | 91 |
| $14\%^{w/v}$ $FeCl_3$ 4th iron contact cycle | 120 |
| $21\%^{w/v}$ $FeCl_3$ 2nd iron contact cycle | 128 |
| $28.5\%^{w/v}$ $FeCl_3$ 1st iron contact cycle | 114 |
| $28.5\%^{w/v}$ $FeCl_3$ 2nd iron contact cycle | 206 |
| $35\%^{w/v}$ $FeCl_3$ 1st iron contact cycle | 121 |
| $35\%^{w/v}$ $FeCl_3$ 2nd cycle | 173 |
| $50\%^{w/v}$ $FeCl_3$ 1st iron contact cycle | 36 |

Increasing the iron concentration in water also subsequently increased the iron loading of the resin beads. For example, iron loading increased from 128 mg Fe/g resin bead loading in the second loading cycle using $21\%^{w/v}$ $FeCl_3$ in water, to 206 mg Fe/g resin bead loading in the second loading cycle using $28.5\%^{w/v}$ $FeCl_3$ in water. When the concentration of $FeCl_3$ in water was increased to $50\%^{w/v}$, the resin bead loading decreased (36 mg Fe/g resin bead loading in the first loading cycle using $50\%^{w/v}$ $FeCl_3$ in water, versus 114 mg Fe/g resin bead loading in the first loading cycle using $28.5\%^{w/v}$ $FeCl_3$ in water). This indicated there was an optimum ferric chloride concentration to obtain the greatest amount of iron on the final product.

Figure 2:
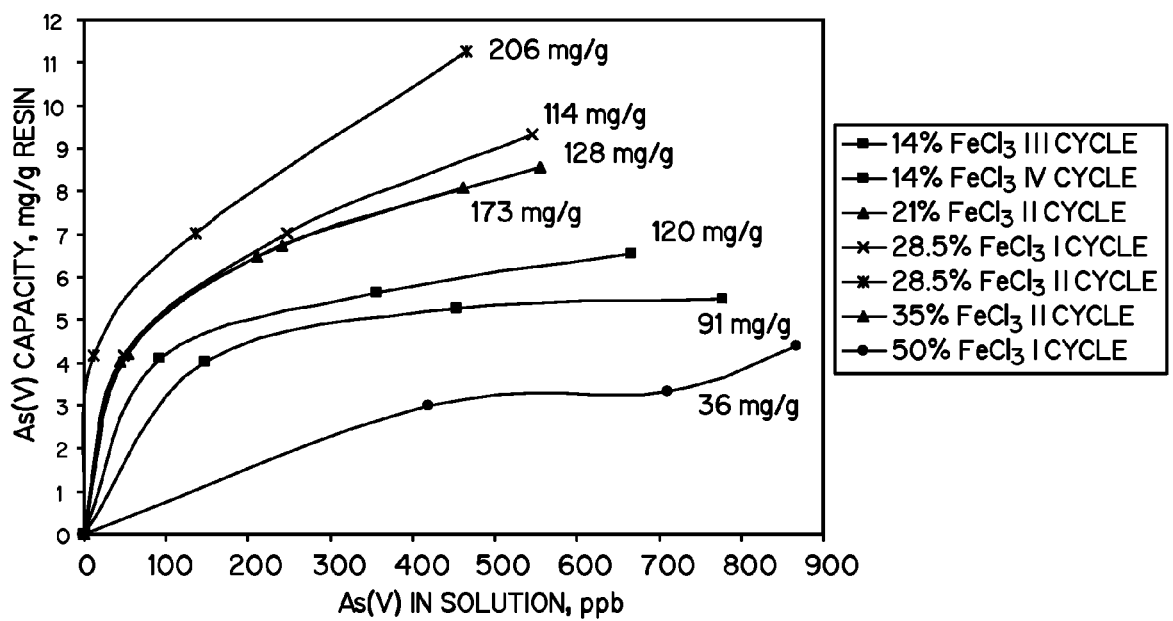
FIG. 2 shows As(V) capacity isotherms for resins of different iron loadings prepared by one embodiment of the method.

The As(V) capacity is dependent upon the iron loading, as demonstrated by the As(V) isotherms in FIG. 2. The capacity decreased significantly when the iron loading was <100 mg Fe/g dry resin. Conversely, as more iron was loaded on the resin, the arsenic capacity was improved.

EXAMPLE 3

Figure 3:
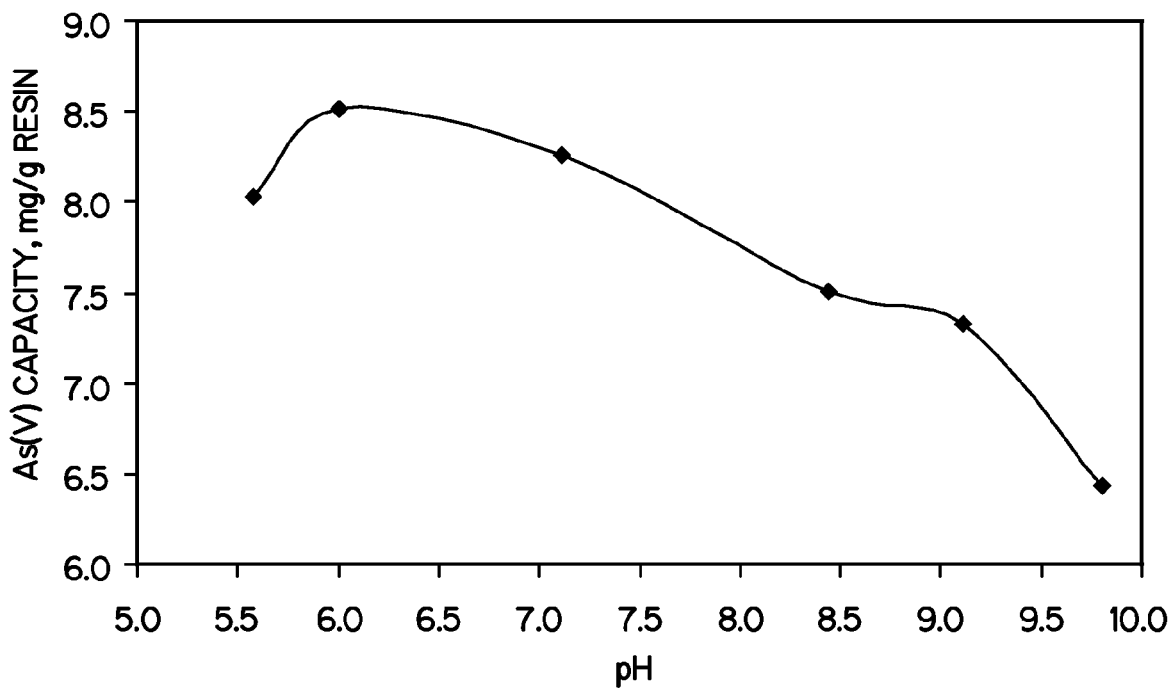
FIG. 3 shows the effect of pH on As(V) uptake for a resin prepared by one embodiment of the method.

The effect of pH on As(V) uptake by the resin beads prepared in Example 2 with 206 mg Fe/g dry material is shown in FIG. 3. Six samples of 0.05 g iron loaded resin were contacted with 200 mL of a simulated contaminated solution. The simulated contaminated solution contained 1 ppm arsenic(V), 120 ppm sulfate, 100 ppm bicarbonate, and 33 ppm chloride. The pH of the solutions was adjusted to the desired pH (pH 5.5, 6.0, 7.0, 8.5, 9.0, about 9.8) with HCl or NaOH. The amount of arsenic remaining in solution was measured after about 18 hr contact with the resin, and the final pH values were recorded. As shown in FIG. 3, the maximum As(V) uptake by the resin beads was obtained at a pH value of pH 6.

EXAMPLE 4

A gel-type strong base Type I anion exchange resin (17.25 g (25 mL) Thermax Tulsion A-23P) was contacted with 100 mL $30\%^{w/v}$ $FeCl_3$ in water for 15, 30, 45 and 60 minutes for only one resin contact cycle. After each contact time, the iron solution was decanted from the top of the beads and then contacted with 100 mL of $7.5\%^{w/v}$ NaOH for thirty minutes with stirring. The resin beads, which were translucent red, were washed with tap water and neutralized with $CO_2$-sparged $5\%^{w/v}$ NaCl.

The results are shown in Table 3.

TABLE 3

| Contact time (min) | [Fe] mg/g dry resin beads |
|---|---|
| 15 | 104 |
| 30 | 120 |
| 45 | 120 |
| 60 | 118 |

Shortening the reaction contact time from one hour to either forty-five minutes or thirty minutes did not result in any reduction in the iron content.

EXAMPLE 5

A gel-type strong base Type I anion exchange resin (17.25 g (25 mL) Thermax Tulsion A-23P) was contacted with $30\%^{w/v}$ $FeCl_3$ in water at either a ratio of one resin bead volume to two solution volumes (25 mL resin bead volume added to 50 mL solution volume, or 1:2), or one resin bead volume to four solution volumes (25 mL resin bead volume added to 100 mL solution volume, or 1:4). The results are shown in Table 4.

TABLE 4

| Volume ratio | [Fe] mg/g dry resin beads |
|---|---|
| 1:4 | 113 |
| 1:2 | 99 |

A slight decrease in iron content was observed at the 1:2 resin bead to solution volume ratio, when compared to the 1:4 resin bead to solution volume ratio. Both the 1:2 and 1:4 resin bead to solution volume ratios, however, resulted in significant iron loading of the resin beads.

EXAMPLE 6

A gel-type strong base Type I anion exchange resin (17.25 g (25 mL) Thermax Tulsion A-23P) was contacted with 100 mL of 30%$^{w/v}$ FeCl$_3$ in deionized water for thirty minutes. The iron loaded resin beads were separated from the iron (III) chloride solution by filtration and then contacted with 100 mL of 7.5%$^{w/v}$ NaOH for thirty minutes. Unbound HFO, evidenced as brown iron floc, was decanted and the iron-loaded resin rinsed with tap water until free of loose iron. A fresh 100 mL of 30%$^{w/v}$ FeCl$_3$ in deionized water was then added to the iron loaded resin beads and stirred for thirty minutes (second iron contact cycle). These resin beads were again separated by filtration and then contacted with 100 mL 7.5%$^{w/v}$ NaOH for thirty minutes to precipitate the HFO particles. The residual iron floc was decanted and the resin beads were washed with tap water until free of loose iron. The iron loaded black resin beads were washed and neutralized with CO$_2$-sparged 5%$^{w/v}$ NaCl. The iron content of the resin beads was 191 mg iron/g of dry material.

EXAMPLE 7

A gel-type strong base Type I anion exchange resin (17.25 g (25 mL) Thermax Tulsion A-23P) was contacted with 75 mL of 30%$^{w/v}$ FeCl$_3$ in water for thirty minutes. The iron loaded resin beads were separated from the iron (III) chloride solution by filtration and then contacted with 75 mL of 7.5%$^{w/v}$ NaOH for fifteen minutes. Unbound HFO, evidenced as brown iron floc, was decanted and the iron loaded resin beads were rinsed with tap water until free of loose iron. A fresh 75 mL of 30%$^{w/v}$ FeCl$_3$ in water was then added to the iron loaded resin beads and stirred for thirty minutes (second iron contact cycle). These resin beads were again separated by filtration and then contacted with 75 mL 7.5%$^{w/v}$ NaOH for fifteen minutes to precipitate the HFO particles. The residual iron floc was decanted and the resin beads were washed with tap water until free of loose iron. The iron loaded black resin beads were washed and neutralized with CO$_2$-sparged 5% NaCl. The iron content of the resin beads was 184 mg iron/g of dry material.

EXAMPLE 8

Five gel-type strong base Type I anion exchange resins (34.5 g (50 mL) of were contacted with 150 mL of 30%$^{w/v}$ FeCl$_3$ in water for thirty minutes. The resins were Thermax Tulsion A-23P, US Filter A-284 and A-464 (U.S. Filter, Bradley Ill.), Purolite A400 (The Purolite Company, Bala Cynwyd Pa.) and Jacobi Resinex A-4 (Jacobi Carbons Inc., Philadelphia Pa.). The iron loaded resin beads were separated from the iron (III) chloride solution by filtration and then contacted with 150 mL of 7.5%$^{w/v}$ NaOH for fifteen minutes. Unbound HFO, evidenced as brown iron floc, was decanted and the iron loaded resin beads were rinsed with tap water until free of loose iron. Fresh 150 mL of 30%$^{w/v}$ FeCl$_3$ in water was then added to the iron loaded resin beads and stirred for thirty minutes (second iron contact cycle). This resin was again separated by filtration and then contacted with 150 mL 7.5%$^{w/v}$ NaOH for fifteen minutes to precipitate the HFO particles. The residual iron floc was decanted and the resin beads were washed with tap water until free of loose iron. The iron loaded black resin beads were washed and neutralized with CO$_2$-sparged 5% NaCl.

The iron loading on these different gel-type strong base (Type I) anion exchange resins is shown in Table 5.

TABLE 5

| Resin | Iron Loading Contact Cycle I Fe mg/g dry resin | Iron Loading Contact Cycle II Fe mg/g dry resin |
| --- | --- | --- |
| Tulsion A-23P | 91 | 157 |
| USF A-284 | 77 | 104 |
| USF A-464 | 82 | 157 |
| Purolite A400 | 108 | 117 |
| Resinex A-4 | 103.5 | 150 |

Figure 4:
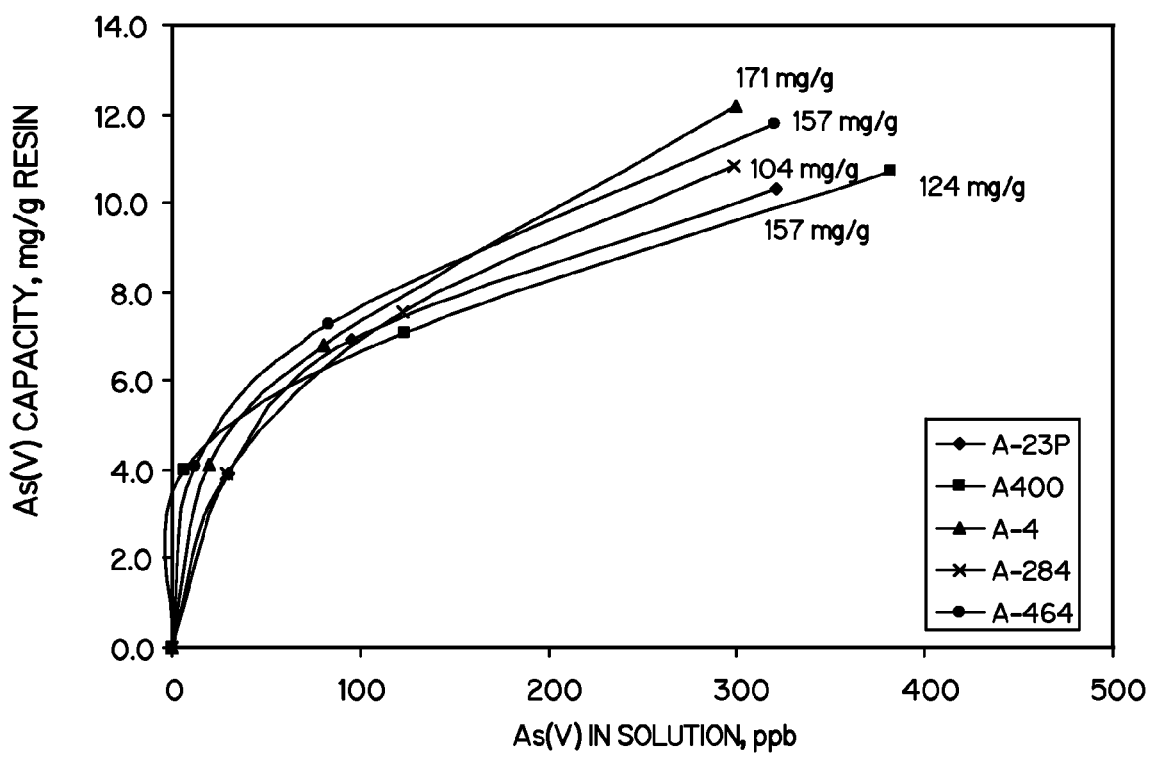
FIG. 4 shows As(V) capacity isotherms for different resin bases prepared by one embodiment of the method.

Isotherms demonstrating performance capacity for As(V) for these gel type resins loaded with iron are shown in FIG. 4. All samples performed practically identically, which demonstrated that any of these gel-type strong base anion exchange resins (Type I), regardless of manufacturer, could be used as a base resin with the inventive method.

EXAMPLE 9

A gel-type strong base Type II anion exchange resin (34.5 g (50 mL) (Thermax Tulsion A-32) was contacted with 200 mL of 30%$^{w/v}$ FeCl$_3$ in deionized water for one hour. The iron loaded resin beads were separated from the iron (III) chloride solution by filtration and then contacted with 200 mL of 7.5%$^{w/v}$ NaOH for thirty minutes. Unbound HFO, evidenced as brown iron floc, was decanted and the iron loaded resin beads were rinsed with tap water until free of loose iron. A fresh 200 mL of 30%$^{w/v}$ FeCl$_3$ in water was then added to the iron loaded resin beads and stirred for one hour (second iron contact cycle). These resin beads were again separated by filtration and then contacted with 200 mL 7.5%$^{w/v}$ NaOH for thirty minutes to precipitate the HFO particles. The residual iron floc was decanted and the resin beads were washed with tap water until free of loose iron. The iron loaded black resin beads were washed and neutralized with CO$_2$-sparged 5% NaCl. The iron content of the final product was 127 mg/g of dry resin. This example demonstrated that iron could also be loaded on Type II anion exchange resins.

EXAMPLE 10

Eight mL of four selected iron-loaded resins (Jacobi A-4, A-284, A-32 Type II, A-23P) was loaded in a separate ion exchange column (about 6 g of resin). Synthetic drinking water, spiked with 300 ppb As(V) at pH 8 was pumped through each column at a flow rate of 16 mL/min (i.e., a 30 second contact time) and the arsenic content of the effluent was measured. Each column was stopped for the night and restarted in the morning.

Figure 5:
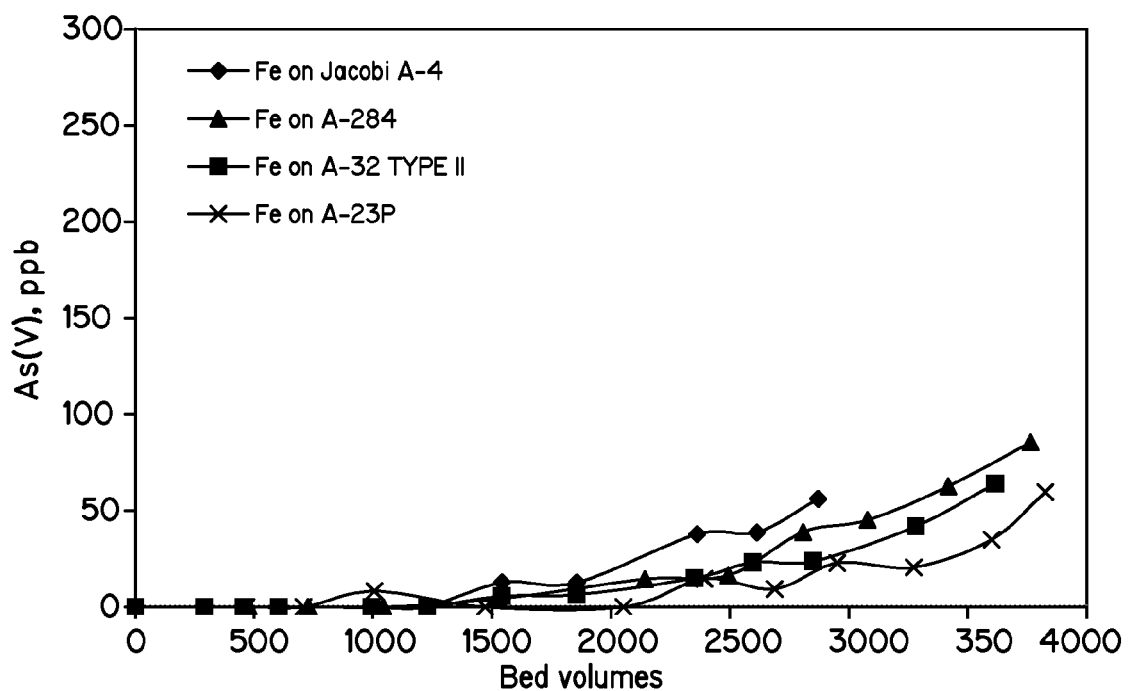
FIG. 5 shows performance of four iron loaded resins at removing arsenic from synthetic drinking water.

The arsenic breakthrough curves for each of the resins are shown in FIG. 5. These data demonstrated that even at a short contact time, arsenic was effectively removed by all four of the resins for several thousand bed volumes until significant breakthrough of arsenic occurs.

Other variations and embodiments of the invention will also be apparent to one of ordinary skill in the art from the above description and examples. Thus, the foregoing embodiments are not to be construed as limiting the scope of this invention.

What is claimed is:

1. A method to load an anion exchange material with a metal, the method comprising
    contacting an anion exchange material with a metal salt in a solvent consisting essentially of water under conditions to load the anion exchange material with a metal salt,
    contacting the metal salt loaded anion exchange material with a base for a time sufficient to precipitate a hydrous metal oxide, and
    washing and neutralizing the metal oxide loaded anion exchange material to remove excess base.

2. The method of claim 1 where the metal is a soluble salt of at least one of iron, copper, zinc, nickel, manganese, titanium, zirconium, yttrium, lanthanum, lanthanides, scandium, yttrium, hafnium, vanadium, niobium, tantalum, chromium, molybdenum, tungsten, rhenium, ruthenium, osmium, cobalt, rhodium, iridium, palladium, platinum, silver, gold, cadmium, gallium, indium, thallium, germanium, tin, lead, antimony, bismuth, actinium, or actinides.

3. The method of claim 2 where the iron salt is a soluble iron(III) salt.

4. The method of claim 1 wherein a neutralized metal oxide loaded anion exchange material is used to provide additional metal oxide loading.

5. The method of claim 1 wherein the metal oxide loaded anion exchange material is dried at a temperature between about 19° C. to about 150° C.

6. The method of claim 1 wherein the anion exchange material is a Type I or Type II strong base organic ion exchange resin bead containing quaternary ammonium groups with a positively charged nitrogen atom.

7. The method of claim 1 wherein the anion exchange material is a weak base organic ion exchange resin bead containing primary, secondary and/or tertiary amine groups.

8. The method of claim 1 wherein the anion exchange material is at least one of a polymeric matrix, a polymeric fiber, a polystyrene matrix, a polystyrene/divinylbenzene matrix, or a polyacrylic matrix.

9. The method of claim 1 wherein the anion exchange material is at least one of hydrous alumina, hydrous zirconia, hydrous titania, hydrotalcites, or layered double hydroxides (LDH).

10. A method of removing at least one contaminant from a fluid stream, the method comprising contacting at least a portion of a fluid stream with a metal oxide loaded anion exchange material under conditions sufficient to result in a treated fluid stream with reduced contaminants, the loaded anion exchange material prepared by
    contacting the anion exchange material with a metal salt in a solvent consisting essentially of water under conditions to load the anion exchange material with a metal salt,
    contacting the metal salt loaded anion exchange material with a base for a time sufficient to precipitate a hydrous metal oxide, and
    washing and neutralizing the metal oxide loaded anion exchange material to remove excess base.

11. The method of claim 10 wherein the contaminants are selected from at least one of arsenate, arsenite, chromate, molybdate, selenite, phosphate, vanadate, or natural organic matter.

12. The method of claim 10 where the fluid is at least one of drinking water, groundwater, industrial process water, organic solvent, mixed solvent systems, or industrial effluents.

13. The method of claim 10 wherein the metal salt is crystalline or non-crystalline hydrous iron oxide particles.

14. A method to load an anion exchange material with hydrous iron oxide, the method comprising
    contacting an anion exchange material with a solution of $FeCl_3$ in a solvent consisting essentially of water under conditions to load the anion exchange material $FeCl_3$,
    contacting the $FeCl_3$ loaded anion exchange material with a base for a time sufficient to precipitate a hydrous metal oxide, and
    washing and neutralizing the hydrous iron oxide loaded anion exchange material to remove excess base.

15. The method of claim 14 further comprising using the resulting hydrous iron oxide loaded anion exchange material as a sorbent for at least one contaminant in a fluid stream.

16. The method of claim 14 wherein the contaminant is selected from at least one of arsenate, arsenite, chromate, molybdate, selenite, phosphate, vanadate, or natural organic matter.

17. The method of claim 15 where the fluid stream is at least one of drinking water, groundwater, industrial process water, organic solvent, mixed solvent systems, or industrial effluents.

18. The method of claim 14 using $FeCl_3$ at a concentration ranging between $7\%^{w/v}$ to about $50\%^{w/v}$ in the solution.

19. The method of claim 14 where the contaminant is at least one of arsenate As(V), arsenite As(III), vanadate V(V), molybdate Mo(VI), phosphate P(V), chromate or dichromate Cr(VI), selenite Se(IV), or natural organic matter.

* * * * *